(12) United States Patent
Jang et al.

(10) Patent No.: US 12,554,974 B2
(45) Date of Patent: Feb. 17, 2026

(54) DEVICE AND METHOD WITH NEURAL NETWORK OPERATION

(71) Applicant: Samsung Electronics Co., Ltd., Suwon-si (KR)

(72) Inventors: Jun-Woo Jang, Suwon-si (KR); Yoojin Kim, Suwon-si (KR); Channoh Kim, Suwon-si (KR); Hyun Sun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1043 days.

(21) Appl. No.: 17/523,129

(22) Filed: Nov. 10, 2021

(65) Prior Publication Data

US 2022/0164674 A1     May 26, 2022

(30) Foreign Application Priority Data

Nov. 24, 2020    (KR) ........................ 10-2020-0158933

(51) Int. Cl.
*G06N 3/063*      (2023.01)
*G06F 17/15*      (2006.01)
*G06N 3/0464*     (2023.01)

(52) U.S. Cl.
CPC ........... *G06N 3/063* (2013.01); *G06F 17/153* (2013.01); *G06N 3/0464* (2023.01)

(58) Field of Classification Search
CPC ...... G06F 17/153; G06N 3/04; G06N 3/0464; G06N 3/063; G06N 3/08; G06N 3/10
See application file for complete search history.

(56) References Cited

U.S. PATENT DOCUMENTS

| 2018/0300605 A1 | 10/2018 | Ambardekar et al. |
| 2019/0340010 A1 | 11/2019 | Lee et al. |

(Continued)

FOREIGN PATENT DOCUMENTS

| CN | 108805272 A | 11/2018 |
| CN | 111382859 A | 7/2020 |

(Continued)

OTHER PUBLICATIONS

Yu, Fisher, et al. "Multi-Scale Context Aggregation By Dilated Convolutions" *Published as a conference paper at ICLR 2016* arXiv:1511.07122v3 Apr. 30, 2016 (13 pages in English).

(Continued)

*Primary Examiner* — Emily E Larocque
(74) *Attorney, Agent, or Firm* — NSIP Law

(57) ABSTRACT

A neural network device includes: a memory configured to store a first feature map and a second feature map; and a neural network processor configured to operate a neural network, and comprising: a fetcher configured to fetch input data from the first feature map of the memory; a buffer configured to store the input data; an operator configured to generate output data by performing a convolution operation between the input data and a kernel; a writer configured to write the output data in the second feature map of the memory; and a controller configured to control the fetcher to fetch the input data and control the writer to write the output data, according to one or more intervals and one or more offsets determined based on a dilation rate of the kernel in multiple steps.

37 Claims, 12 Drawing Sheets

(56) References Cited

U.S. PATENT DOCUMENTS

| | | | |
|---|---|---|---|
| 2020/0175313 A1 | 6/2020 | Jang | |
| 2020/0327079 A1* | 10/2020 | Zhao | G06N 3/08 |
| 2020/0410036 A1* | 12/2020 | Huynh | G06N 3/045 |
| 2022/0066776 A1* | 3/2022 | Stevens | G06N 3/063 |
| 2022/0287671 A1* | 9/2022 | Huang | A61B 6/037 |

FOREIGN PATENT DOCUMENTS

| | | |
|---|---|---|
| EP | 3 678 088 A1 | 7/2020 |
| KR | 10-2016-0133924 A | 11/2016 |
| KR | 10-2019-0041819 A | 4/2019 |
| KR | 10-2020-0066952 A | 6/2020 |
| KR | 10-2020-0084808 A | 7/2020 |

OTHER PUBLICATIONS

Chen, Liang-Chieh, et al. "Semantic Image Segmentation with Deep Convolutional Nets and Fully Connected CRFs" *Published as a conference paper at ICLR 2015* arXiv:1412.7062v4 Jun. 7, 2016 (14 pages in English).

Chen, Liang-Chieh, et al. "Rethinking Atrous Convolution for Semantic Image Segmentation" *Google Inc.* arXiv:1706.05587v3 Dec. 5, 2017 (14 pages in English).

Fu, Huan, et al. "Deep Ordinal Regression Network for Monocular Depth Estimation" *Proceedings of the IEEE conference on computer vision and pattern recognition UBTECH Sydney AI Centre*, et al. 2018 (10 pages in English).

Extended European Search report issued on Apr. 19, 2022, in counterpart European Patent Application No. 21210174.5 (10 pages in English).

Korean Office Action issue on Jan. 17, 2025 in corresponding Korean Patent Application No. 10-2020-0158933. (3 pages in English and 6 pages in Korean).

Chinese Office Action Issued on Aug. 20, 2025, in Counterpart Chinese Patent Application No. 202111402485.3 (28 Pages in English, 19 Pages in Chinese).

\* cited by examiner

FIG. 10

DEVICE AND METHOD WITH NEURAL NETWORK OPERATION

CROSS-REFERENCE TO RELATED APPLICATIONS

This application claims the benefit under 35 USC § 119(a) of Korean Patent Application No. 10-2020-0158933, filed on Nov. 24, 2020, in the Korean Intellectual Property Office, the entire disclosure of which is incorporated herein by reference for all purposes.

BACKGROUND

1. Field

The following description relates to a device and method with one or more neural network operations.

2. Description of Related Art

Neural networks may be used to analyze input data and extract valid information in various types of electronic systems. In particular, a convolutional neural network (CNN) may exhibit excellent performance in extracting spatial features included in an image. However, a convolution operation for operating a CNN may require a high input/output bandwidth.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a neural network device includes: a memory configured to store a first feature map and a second feature map; and a neural network processor configured to operate a neural network, and comprising: a fetcher configured to fetch input data from the first feature map of the memory; a buffer configured to store the input data; an operator configured to generate output data by performing a convolution operation between the input data and a kernel; a writer configured to write the output data in the second feature map of the memory; and a controller configured to control the fetcher to fetch the input data and control the writer to write the output data, according to one or more intervals and one or more offsets determined based on a dilation rate of the kernel in multiple steps.

For the controlling of the fetcher, the controller may be configured to control the fetcher to fetch the input data without redundancy from the first feature map of the memory according to a first offset of the one or more offsets and a first interval of the one or more intervals determined based on the dilation rate.

For the fetching of the input data, the fetcher may be configured to fetch pieces of the input data corresponding to positions reached by skipping the first interval in a predetermined direction from a position of an index corresponding to the first offset in the first feature map.

For the controlling of the writer, the controller may be configured to control the writer to write the output data without redundancy in the second feature map of the memory according to a second offset of the one or more offsets and a second interval of the one or more intervals determined based on the dilation rate.

For the writing of the output data, the writer may be configured to write the output data at positions reached by skipping the second interval in a predetermined direction from a position of an index corresponding to the second offset in the second feature map.

For the fetching of the input data, the fetcher may be configured to fetch the input data from the first feature map of the memory according to a first offset of the one or more offsets and a first interval of the one or more intervals, and for the writing of the output data, the writer may be configured to write the output data in the second feature map of the memory according to a second offset of the one or more offsets and a second interval of the one or more intervals.

In response to a stride parameter of the convolution operation being a preset first value, the controller may be configured to: set the first interval and the second interval to have same values as a value corresponding to the dilation rate; and set the first offset and the second offset to have same values as a value of an index of a corresponding step among the multiple steps.

In response to a stride parameter of the convolution operation being greater than or equal to a preset first value, the controller may be configured to: set the first interval and the second interval to be different from each other; and set the first offset and the second offset to be different from each other.

For the setting of the first offset and the second offset, the controller may be configured to: set the first offset based on a combination of the stride parameter and a value of an index of a corresponding step among the multiple steps; and set the second offset to the value of the index of the corresponding step.

For the setting of the first interval and the second interval, the controller may be configured to: set the first interval to have a same value as a value of the dilation rate; and set the second interval to a value obtained by dividing the dilation rate by a greatest common divisor (GCD) of the dilation rate and the stride parameter.

The controller may be configured to determine a total number of the multiple based on whether the first offset satisfies a first condition of having a same value as a value obtained by subtracting the stride parameter from a least common multiple (LCM) of the dilation rate and the stride parameter, and based on whether the second offset satisfies a second condition of having a same value as a value obtained by subtracting "1" from a value obtained by dividing the dilation rate by a GCD of the dilation rate and the stride parameter.

For the generating of the output data, in response to the first feature map comprising a plurality of channels, the operator may be configured to perform a dilated convolution operation between the channels and the kernel.

An interval between pieces of output data arranged adjacent to each other in the second feature map may be determined based on either one or both of the dilation rate and a stride parameter of the convolution operation.

The neural network device may include any one or any combination of any two or more of a head-up display (HUD) device, a three-dimensional (3D) digital information display (DID), a navigation system, a 3D mobile device, a smartphone, a smart television (TV), and a smart vehicle.

The memory may be configured to store instructions that, when executed by the neural network processor, configure the neural network processor to operate the neural network.

In another general aspect, an operating method of a neural network device includes: fetching input data from a first feature map of a memory according to a first interval determined based on a dilation rate of a kernel; storing the input data in a buffer; generating output data by performing a convolution operation between the input data and the kernel; and writing the output data in a second feature map of the memory according to a second interval determined based on the dilation rate of the kernel.

The fetching of the input data may include fetching the input data without redundancy from the first feature map according to the first interval and a first offset determined based on the dilation rate.

The fetching of the input data may include fetching pieces of the input data corresponding to positions reached by skipping the first interval in a predetermined direction from a position of an index corresponding to the first offset in the first feature map.

The writing of the output data may include writing the output data without redundancy in the second feature map of the memory according to the second interval and a second offset determined based on the dilation rate.

The writing of the output data may include writing the output data at positions reached by skipping the second interval in a predetermined direction from a position of an index corresponding to the second offset in the second feature map.

The fetching of the input data may include fetching the input data from the first feature map according to the first interval and a first offset determined based on the dilation rate, and the writing of the output data may include writing the output data in the second feature map of the memory according to the second interval and a second offset determined based on the dilation rate.

The method may be repeatedly performed in multiple steps, and may include, in response to a stride parameter of the convolution operation being a preset first value, setting the first interval and the second interval to have same values as a value corresponding to the dilation rate, and setting the first offset and the second offset to have same values as a value of an index of a corresponding step among the multiple steps.

The method may include, in response to a stride parameter of the convolution operation being greater than or equal to a preset first value, setting the first interval and the second interval to be different from each other, and setting the first offset and the second offset to be different from each other.

The method may include: setting the first offset t based on a combination of the stride parameter and a value of an index of a corresponding step among multiple steps; and setting the second offset to the value of the index of the corresponding step.

The method may include: setting the first interval to have a same value as a value of the dilation rate; and setting the second interval to a value obtained by dividing the dilation rate by a greatest common divisor (GCD) of the dilation rate and the stride parameter.

The method may be repeatedly performed in multiple steps, and a number of the multiple steps may be determined based on whether the first offset satisfies a first condition of having a same value as a value obtained by subtracting the stride parameter from a least common multiple (LCM) of the dilation rate and the stride parameter, and based on whether the second offset satisfies a second condition of having a same value as a value obtained by subtracting "1" from a value obtained by dividing the dilation rate by a GCD of the dilation rate and the stride parameter.

The generating of the output data may include, in response to the first feature map comprising a plurality of channels, performing a dilated convolution operation between the channels and the kernel.

An interval between pieces of output data arranged adjacent to each other in the second feature map may be determined based on either one or both of the dilation rate and a stride parameter of the convolution operation.

In another general aspect, one or more embodiments include a non-transitory computer-readable storage medium storing instructions that, when executed by a processor, configure the processor to perform any one, any combination, or all operations and methods described herein.

In another general aspect, a neural network device includes: one or more processors configured to: determine, based on a dilation rate of a kernel, input data to be fetched among pieces of a first feature map stored in a memory; fetch the determined input data from the memory and store the input data in a buffer; generate output data by performing a convolution operation between the input data and the kernel; and write the output data to a second feature map in the memory.

For the determining of the input data to be fetched, the one or more processors may be configured to determine the input data to be pieces of the first feature map separated by the dilation rate.

For the performing of the convolution operation, the one or more processors may be configured to perform a first convolution operation between a first portion of the input data and the kernel, and a second convolution operation between a second portion of the input data and the kernel.

The second portion may include: one or more pieces of the first feature map included in the first portion; and one or more pieces of the first feature map not included in the first portion.

In response to the writing of the output data, the one or more processors may be configured to determine, based on the dilation rate and a stride parameter, subsequent input data to be fetched among the pieces of the first feature map stored in the memory.

The subsequent input data may include different pieces of the first feature map than included in the input data.

In another general aspect, an operating method of a neural network device includes: determining pieces of a first feature map separated by a dilation rate of a kernel; generating a second feature map by performing a convolution operation between the pieces and the kernel, wherein the kernel is not dilated by the dilation rate and the second feature map corresponds to a feature map generated by performing a convolution operation between the first feature map and the kernel dilated by the dilation rate.

The convolution operation between the pieces and the kernel may include a first convolution operation and a second convolution operation, and a portion of the pieces used in the first convolution operation may be reused in the second convolution operation.

Other features and aspects will be apparent from the following detailed description, the drawings, and the claims.

BRIEF DESCRIPTION OF THE DRAWINGS

FIG. 10 illustrates an example of a method of performing a two-dimensional (2D) convolution operation in a neural network device.

Figure 1:
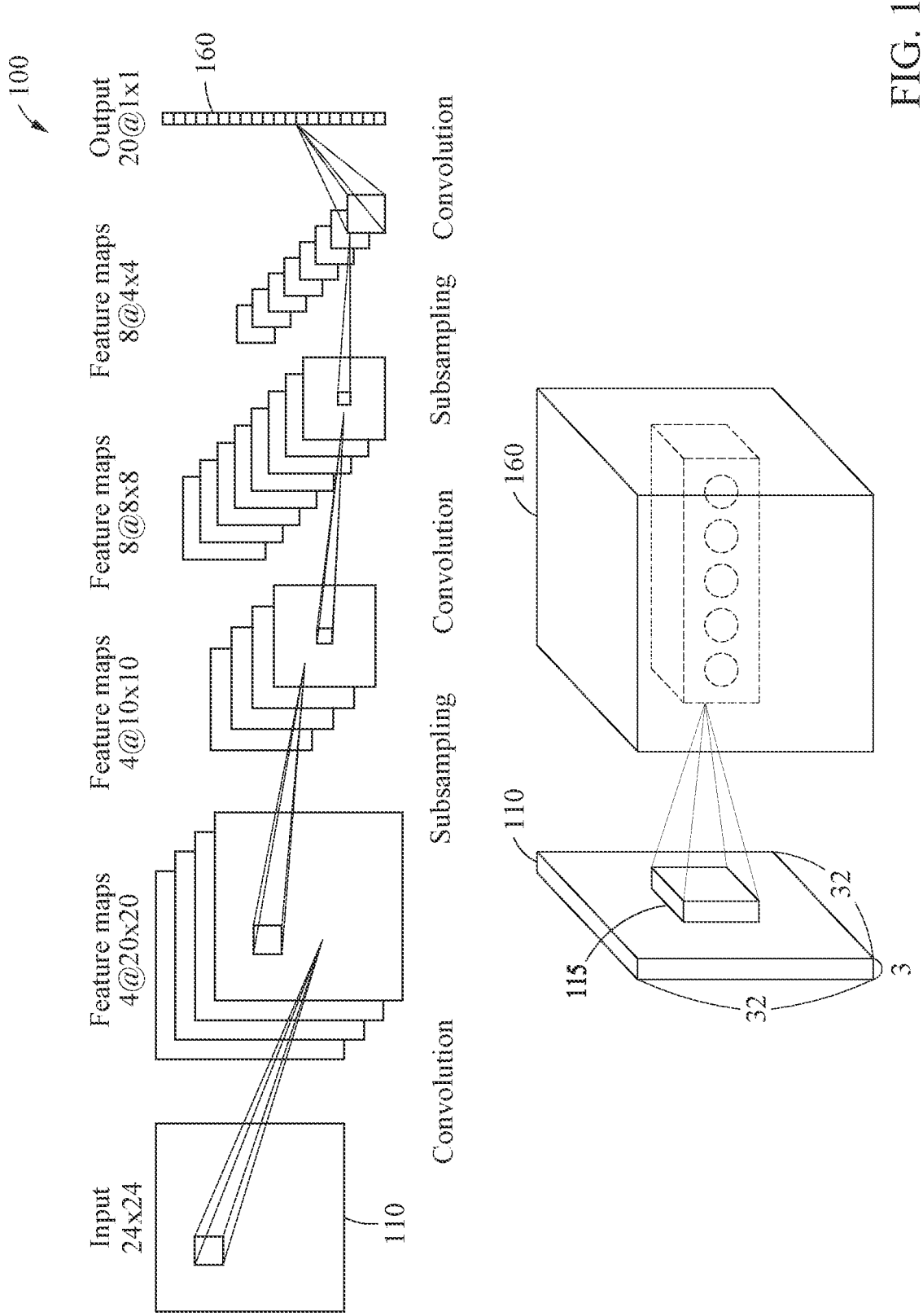
FIG. 1 illustrates an example of a structure of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are used only to distinguish one member, component, region, layer, or section from another member, component, region, layer, or section. For example, a "first" member, component, region, layer, or section referred to in examples described herein may also be referred to as a "second" member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the examples. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, and/or combinations thereof, but do not preclude the presence or addition of one or more other features, integers, steps, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms used herein, including technical and scientific terms, used herein have the same meaning as commonly understood consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like constituent elements and a repeated description related thereto will be omitted.

FIG. 1 illustrates an example of a structure of a neural network. Referring to FIG. 1, a structure of a neural network 100 including a convolution layer and subsampling layers is illustrated.

The neural network 100 may be, for example, a deep neural network (DNN) including a plurality of layers. The DNN may include, for example, a convolutional neural network (CNN), a recurrent neural network (RNN), a deep belief network, and/or a restricted Boltzman machine, but is not necessarily limited thereto.

The neural network 100 may further include a fully connected layer in addition to the convolution layer and subsampling layers shown in FIG. 1. A subsampling layer may also be referred to as a "pooling layer".

The neural network 100 may include a plurality of layers that receive input data, extract input feature maps, and generate output data from the input feature maps. The neural network 100 may generate output feature maps corresponding to a result obtained by performing a convolution operation between a kernel (hereinafter, referred to as a "filter") and input data. Another convolution operation between the kernel and the generated output feature maps as input feature maps may be performed, and new feature maps may be output. As a result obtained by repeatedly performing the above convolution operations, a result of recognizing features of an input image through the neural network 100 may be finally output. Hereinafter, for convenience of description, the input feature map may be referred to as a "first feature map", and the output feature map may be referred to as a "second feature map".

For example, if an input image having a size of 24×24 pixels is applied to the input layer 110 of the neural network 100 of FIG. 1, the input image may be output as feature maps of four channels having a size of 20×20 through a convolution operation between the input image and the kernel. In addition, feature maps of four channels having a size of 10×10 may be output using only a portion of pixel values of the feature maps of four channels having the size of 20×20 through a subsampling process. The subsampling process may include, for example, max-pooling and average-pooling, and the like. Next, the size of the feature maps having the size of 10×10 may be reduced through repeated convolution operations between the feature maps and the kernel and repeated subsampling operations, and thus global features may be finally output.

In the neural network 100, a convolution operation and a subsampling (or pooling) operation may be repeatedly performed in the plurality of layers, and accordingly robust features, which may represent the entire image, may be filtered from the input image applied to the input layer 110 and may be output. Also, the output features may correspond to global features, may be input in a fully connected layer 160, to be finally derived as a recognition result for the input image.

A spatial size of input neurons having an influence on one neuron of an output layer (e.g., the fully connected layer 160) may be referred to as a "receptive field" 115. In a convolution, the receptive field 115 may correspond to, for example, a middle portion of the input layer 110 having an input of 32×32×3 as shown in a lower part of FIG. 1.

In the following examples, a dilated convolution neural network may be used. A dilated convolution may be a scheme of increasing a receptive field by adding zero padding to a filter. A receptive field may be understood as a field that is taken into consideration at once by the filter. When the size of the receptive field increases, the filter may more easily extract overall features from an image. However, in a typical CNN, when the size of the receptive field increases, the size of the filter also increases, which may cause an increase in an amount of computational operation and an increase in overfitting. On the other hand, in the dilated convolutional neural network, the size of the receptive field may be increased while maintaining the size of the filter.

A convolution operation may use a high input/output bandwidth, whereas in the typical CNN, an input/output bandwidth may be reduced using a data reuse scheme between adjacent convolution operations. However, when using the dilated convolutional neural network, it may be difficult for a typical neural network device to reuse data between adjacent convolution operations. In the following examples, one or more embodiments for enabling data reuse in the dilated convolutional neural network are provided.

Figure 2:
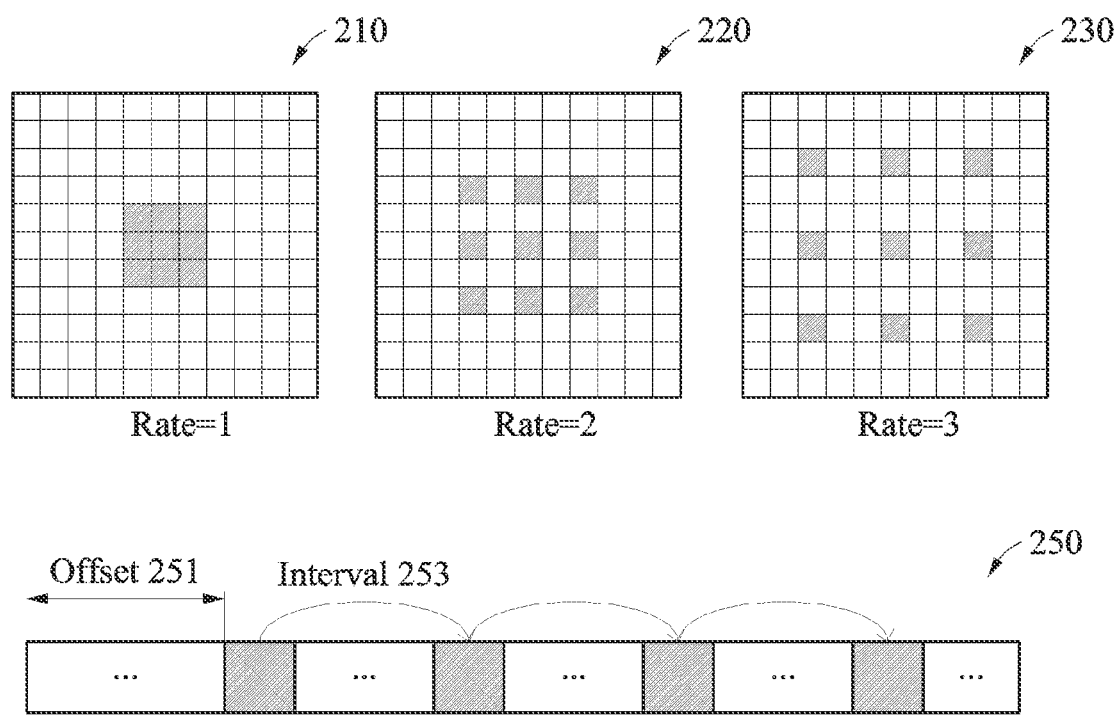
FIG. 2 illustrates an example of a dilation rate, an offset, and an interval of a kernel.

FIG. 2 illustrates an example of a dilation rate, an offset, and an interval of a kernel. For example, FIG. 2 illustrates a structure of each of a dilated convolution 210 with a dilation rate of "1", a dilated convolution 220 with a dilation rate of "2", and a dilated convolution 230 with a dilation rate of "3", for a kernel having a size of 3×3.

In the dilated convolutions 210, 220, and 230, positions of input nodes used in the kernel having the size of 3×3 may be marked by dark boxes. A receptive field of a dilated convolution may vary depending on a dilation rate of the kernel. In an example, when the dilation rate is "1", a 1-dilated 3×3 convolution may be expressed as shown in the dilated convolution 210. When the dilation rate is "1", a receptive field may have a size of "3×3 =9", that is, the size of the receptive field may be equal to the size of the kernel.

In another example, when the dilation rate is "2", a 2-dilated 3×3 convolution may be expressed as shown in the dilated convolution 220. When the dilation rate is "2", the receptive field may have a size of "5×5=25". In another example, when the dilation rate is "3", a 3-dilated 3×3 convolution may be expressed as shown in the dilated convolution 230. When the dilation rate is "3", the receptive field may have a size of "7×7=49". In a DNN, a dilated convolution may be used to classify images as high-resolution images.

To extract features in a neural network device, a filter (e.g., a kernel) may perform a convolution operation while traversing pixels of input data or an input image at regular intervals (e.g., stride), and may generate a feature map or an activation map based on a result of the convolution operation. The feature map may be information of an original image compressed through a convolution operation, and may be expressed as, for example, a matrix. Also, the activation map may correspond to a result obtained by applying an activation function to a feature map. In an example, the activation map may correspond to a final output result of convolution layers that perform convolution operations in a CNN.

In addition, the filter may include, for example, common parameters or weight parameters for finding out features of an image. The filter may correspond to the above-described kernel. Hereinafter, the terms "filter" and "kernel" may be interchangeably used with each other.

As indicated by reference numeral 250, an offset 251 may be understood as a value indicating a start point of an operation on data stored in a memory. For example, to perform a read or write operation on a feature map or data stored in the memory, a value indicating a start point of an operation of reading or writing the data stored in the memory may correspond to the offset 251. For example, when an offset is "0", a read operation may be performed from a first point of input data, and when the offset is "1", the read operation may be performed from a second point of the input data.

An interval 253 at which the filter traverses pixels of the input image or input data when the filter is applied to the input image may be referred to as a "stride". For example, when the stride is "2", the filter may perform a convolution operation while traversing data or pixels of the input image at an interval of two spaces. In this example, a stride parameter or an interval may be expressed as "2".

A shape of data finally output from the CNN may be changed according to, for example, a size of a kernel, a dilation rate of the kernel, and/or a stride parameter. In a convolution layer, a size of a feature map may be less than that of input data due to actions of the filter and a stride.

In an example, when the input image is a color image, each pixel of a feature map may have a value corresponding to each of three colors, i.e., red (R), green (G), and blue (B), to express natural colors. In this example, a first feature map may include three channels. In another example, when the input image is a black-and-white image, a feature map may express black-and-white contrast (without expressing the natural colors through the three colors red (R), green (G), and blue (B)), and the first feature map may include one channel.

Figure 3:
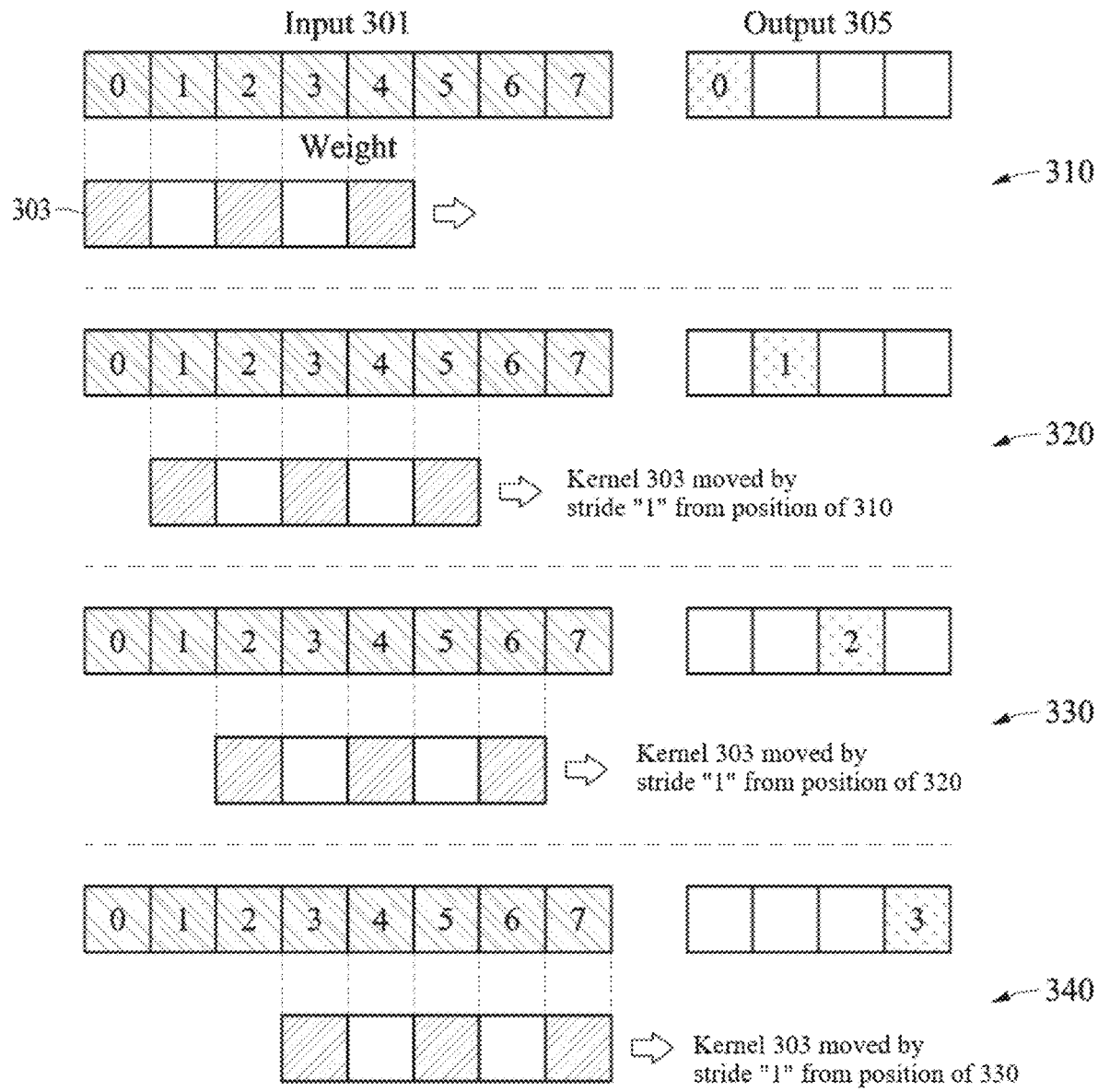
FIG. 3 illustrates an example of a method of performing a one-dimensional (1D) dilated convolution operation.

FIG. 3 illustrates an example of a method of performing a one-dimensional (1D) dilated convolution operation. Referring to FIG. 3, a process of performing a dilated convolution operation between input data 301 and a kernel 303 having a size of "3" and a dilation rate of "2" is illustrated.

For example, there may be eight pieces of input data 301 (for example, "0, 1, 2, 3, 4, 5, 6, 7") and a stride parameter of a convolution operation (for example, an interval) may be "1".

In this example, when the kernel 303 has the size of "3" and the dilation rate of "2", a neural network device may perform a convolution operation between the kernel 303 and five pieces of input data "0, 1, 2, 3, 4" corresponding to a size of "5" of the dilated kernel 303 among the eight pieces of input data 301, as indicated by reference numeral 310. Output data corresponding to a result obtained by performing the convolution operation between the kernel 303 and the five pieces of input data "0, 1, 2, 3, 4" may be written in a first data of an output feature map 305, as indicated by reference numeral 310.

Subsequently, when the stride parameter (for example, a movement interval) is "1", the kernel 303 may move to a right side by "1" for the input data 301, as indicated by reference numeral 320. The neural network device may perform a convolution operation between the kernel 303 and five pieces of input data "1, 2, 3, 4, 5" corresponding to a position to which the kernel 303 moves. A result obtained by performing the convolution operation between the kernel 303 and the five pieces of input data "1, 2, 3, 4, 5" may be written in a second data of the output feature map 305, as indicated by reference numeral 320.

As indicated by reference numerals 330 and 340, the neural network device may sequentially perform a convolution operation between the kernel 303 and input data "2, 3, 4, 5, 6" and a convolution operation between the kernel 303 and input data "3, 4, 5, 6, 7", while moving the kernel 303 to the right side by "1". Respective results obtained by performing the convolution operations may be sequentially written in a third data and a fourth data of the output feature map 305.

In a typical convolution operation, an input window used to calculate output data may overlap a window used to calculate a neighboring output value. In contrast, input data used to calculate output data of a dilated convolution operation may not overlap input data used to calculate neighboring output data, and instead, may overlap a window used to calculate output data at a position spaced apart therefrom by a dilation rate.

In an example, when input windows overlap, data read in advance to reduce memory traffic may be buffered in a buffer to be reused. When the buffer is reused as described above, the corresponding buffer may be referred to as a "reuse buffer". In this example, when calculation is performed while skipping data of a dilated convolution by the dilation rate, a neural network device of one or more embodiments may perform reuse through buffering. In addition, the skipped data may be calculated in the same manner as previous data by adjusting an input offset in a next step.

Figure 4:
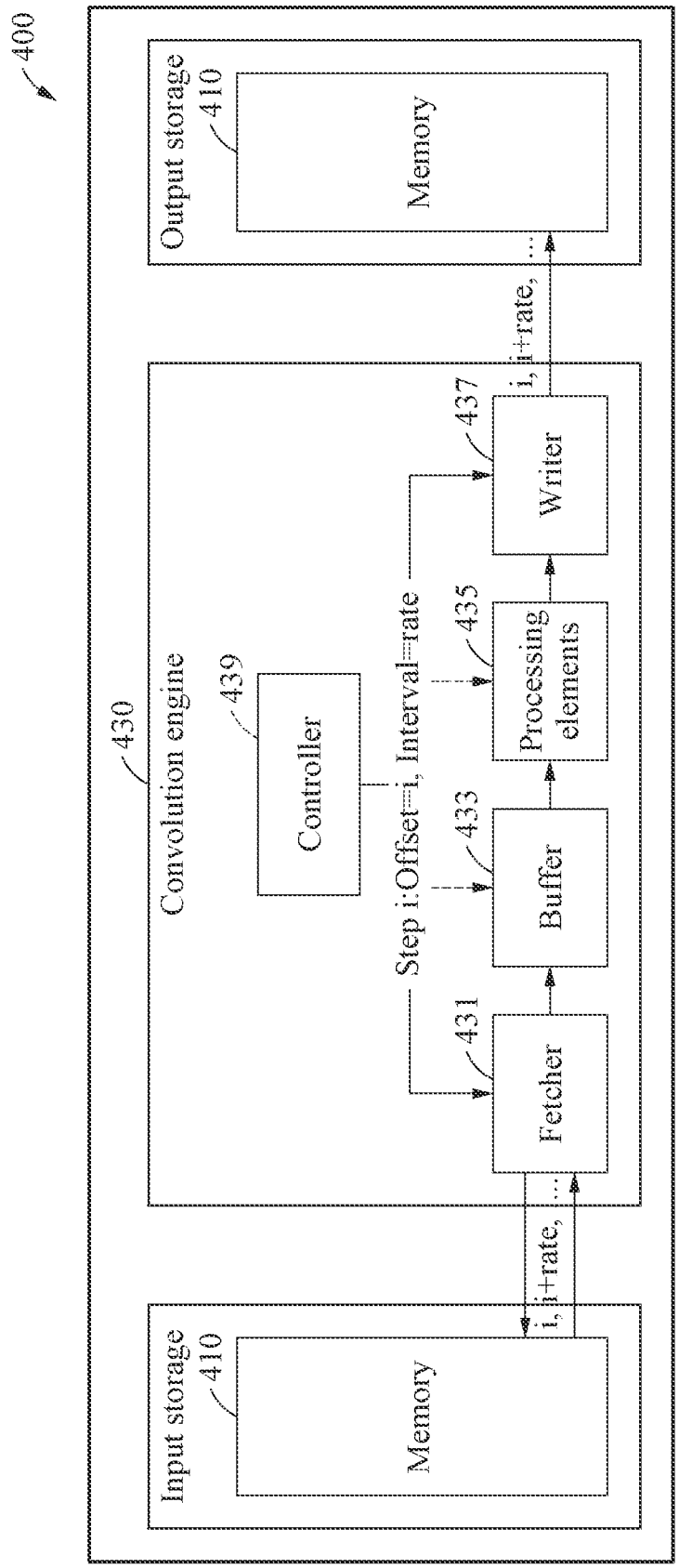
FIG. 4 illustrates an example of a configuration of a neural network device.

FIG. 4 illustrates an example of a configuration of a neural network device. Referring to FIG. 4, a neural network device 400 may include one or more memories 410 and a neural network processor 430 (e.g., a convolution engine). The neural network processor 430 may be, for example, a convolution engine configured to perform a dilated convolution operation. Hereinafter, the terms "neural network processor" and "convolution engine" may be used interchangeably with respect to each other.

The one or more memories 410 may store a first feature map corresponding to an input storage and a second feature map corresponding to an output storage. In a non-limiting example, the one or more memories 410 includes a memory 410 of the input storage and a memory 410 of the output storage. In another non-limiting example, the one or more memories 410 is a memory 410 of both the input storage and the output storage.

The neural network processor 430 may include a fetcher 431, a buffer 433, a processing element 435, a writer 437, and a controller 439 (e.g., one or more processors or neural processors of the neural network processor 430).

The fetcher 431 may fetch input data from the first feature map of the memory 410. The fetcher 431 may send a request for input data to the memory 410 and may fetch the input data according to an offset and an interval that are set by the controller 439. An interval between neighboring pieces of input data fetched by the fetcher 431 from an input feature map may be determined based on a dilation rate.

The fetcher 431 may fetch pieces of input data corresponding to positions reached by skipping a first interval in a predetermined direction from a position of an index corresponding to a first offset in the first feature map. For example, the fetcher 431 may fetch pieces of input data corresponding to positions reached by skipping the first interval in a horizontal direction from the position of the index corresponding to the first offset in the first feature map, and may fetch pieces of input data corresponding to positions reached by skipping an interval corresponding to a size of a kernel in a vertical direction from the position of the index corresponding to the first offset in the first feature map Hereinafter, the "first offset" may be understood as a value indicating a start point at which the fetcher 431 performs a read operation on input data stored in the first feature map of a memory.

The buffer 433 may store (for example, buffer) the input data fetched from the first feature map by the fetcher 431. The buffer 433 may store the input data fetched by the fetcher 431, and may transmit the stored input data to the processing element 435 according to, for example, the size of the kernel and/or a stride parameter.

The processing element 435 may generate output data by performing a convolution operation between the input data and the kernel. The processing element 435 may correspond to a component configured to perform a convolution operation, and may also be referred to as an "operator". Hereinafter, the terms "processing element" and "operator" may be used interchangeably with respect to each other. The processing element 435 may accumulate a product of the input data and the kernel, and may transmit output data corresponding to a final result value through an activation to the writer 437.

For example, when the first feature map includes a plurality of channels, the processing element 435 may perform a convolution operation between each of the plurality of channels and the kernel. For example, when the first feature map includes three channels (for example, an R channel, a G channel, and a B channel), the processing element 435 may perform a dilated convolution operation between the kernel and each of the three channels (for example, each of the R channel, the G channel, and the B channel).

The writer 437 may write the output data generated by the processing element 435 in the second feature map of the memory 410. The writer 437 may write the output data generated by the processing element 435 in the second feature map of the memory 410 according to an offset and an interval determined by the controller 439. For example, the writer 437 may write pieces of output data at positions reached by skipping a second interval in the horizontal direction from a position of an index corresponding to a second offset in a corresponding row of the second feature map. In this example, an interval between pieces of output data arranged adjacent to each other in an output feature map may be determined based on, for example, either one or both of the dilation rate and a stride parameter of a convolution operation.

The controller 439 may control the fetcher 431 to fetch input data without redundancy from the memory 410, and control the writer 437 to write output data without redundancy in the memory 410, according to an interval based on a dilation rate of the kernel. The controller 439 may determine the offset and the interval based on the dilation rate of the kernel.

The controller 439 may control the fetcher 431 to fetch input data without redundancy from the first feature map of the memory 410 according to the first offset and the first interval that are based on the dilation rate.

Also, the controller 439 may control the writer 437 to write output data without redundancy in the second feature map of the memory 410 according to the second offset and the second interval that are based on the dilation rate. Hereinafter, the "second offset" may be understood as a value indicating a start point at which the writer 437 performs an operation of writing or storing output data in the second feature map of the memory 410.

The controller 439 may control the fetcher 431, the buffer 433, the processing element 435, and the writer 437 to repeatedly perform the above-described operations based on the offset and the interval.

In an example, when a stride parameter of a convolution operation is a preset first value (e.g., "1"), the first interval and the second interval may be set to have the same values as a value corresponding to the dilation rate. In this example, the value corresponding to the dilation rate may be the same as that of the dilation rate. The first offset and the second offset may be set to have the same values as a value of an index of a corresponding step among multiple steps. A non-limiting example of an operation of multiple steps will be described below with reference to FIG. 6.

In another example, when the stride parameter of the convolution operation is greater than a first value, the first offset and the second offset may be set to be different from each other, and the first interval and the second interval may be set to be different from each other. The first offset may be set based on a combination of a stride parameter and a value of an index of a corresponding step among the multiple steps, and the second offset may be set to the value of the index of the corresponding step. The first interval may be determined to have the same value as that of the dilation rate, and the second interval may be determined based on a value obtained by dividing the dilation rate by a greatest common divisor (GCD) of the dilation rate and the stride parameter.

When the stride parameter of the convolution operation is greater than the first value, a number of iterations of the multiple steps performed by the neural network processor 430 (for example, the processing element 435) may be determined based on whether the first offset satisfies a first condition of having the same value as a value obtained by subtracting the stride parameter from a least common multiple (LCM) of the dilation rate and the stride parameter, and based on whether the second offset satisfies a second condition of having the same value as a value obtained by subtracting "1" from a value obtained by dividing the dilation rate by the GCD of the dilation rate and the stride parameter.

According to examples, the controller 439 may be separately included in each of the fetcher 431 and the recorder 437. For example, the controller 439 may include a controller included in the fetcher 431 and a controller included in the recorder 437.

The neural network device 400 may be or include, for example, any one or any combination of any two or more of a head-up display (HUD) device, a three-dimensional (3D) digital information display (DID), a navigation system, a 3D mobile device, a smartphone, a smart television (TV), and a smart vehicle.

Figure 5:
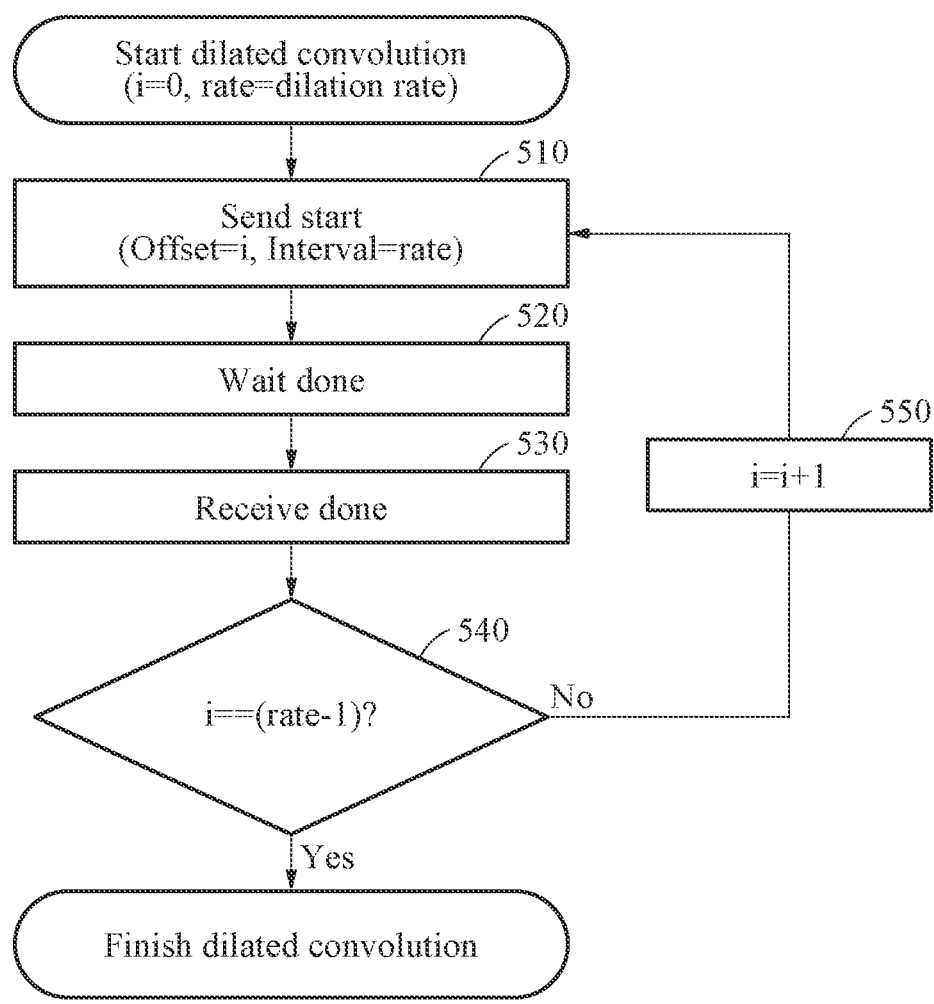
FIG. 5 illustrates an example of an operating process of a neural network device.

FIG. 5 illustrates an example of an operating process of a neural network device. Referring to FIG. 5, a process in which a controller of the neural network device performs a dilated convolution operation through a process of operations 510 to 550 is illustrated. An index i of multiple steps may be initialized to "0".

In operation 510, the controller may transmit a start signal to each module (e.g., a fetcher, a buffer, a processing element (or an operator), a writer, and the like). In this example, an offset value may be set to be the index i of the multiple steps, and an interval may be set to be a dilation rate of a kernel.

In operation 520, the controller may wait until a convolution operation-done signal according to the above-described interval and offset is received from each module.

In operation 530, when the convolution operation-done signal is received from each module, the controller may repeatedly perform the above-described process until a value of the index i becomes equal to a value obtained by subtracting "1" from the dilation rate of the kernel. In operation 540, the controller may determine whether the value of the index i is equal to the value obtained by subtracting "1" from the dilation rate of the kernel. When the value of the index i is determined to be equal to the value obtained by subtracting "1" from the dilation rate of the kernel in operation 540, the controller may finish a convolution operation. When the value of the index i is determined to not be equal to (e.g., determined to be different from or less than) the value obtained by subtracting "1" from the dilation rate of the kernel, the controller may increment the value of the index i by "1" in operation 550, and may perform a dilated convolution operation by repeatedly performing the process from operations 510 to operations 540.

Figure 6:
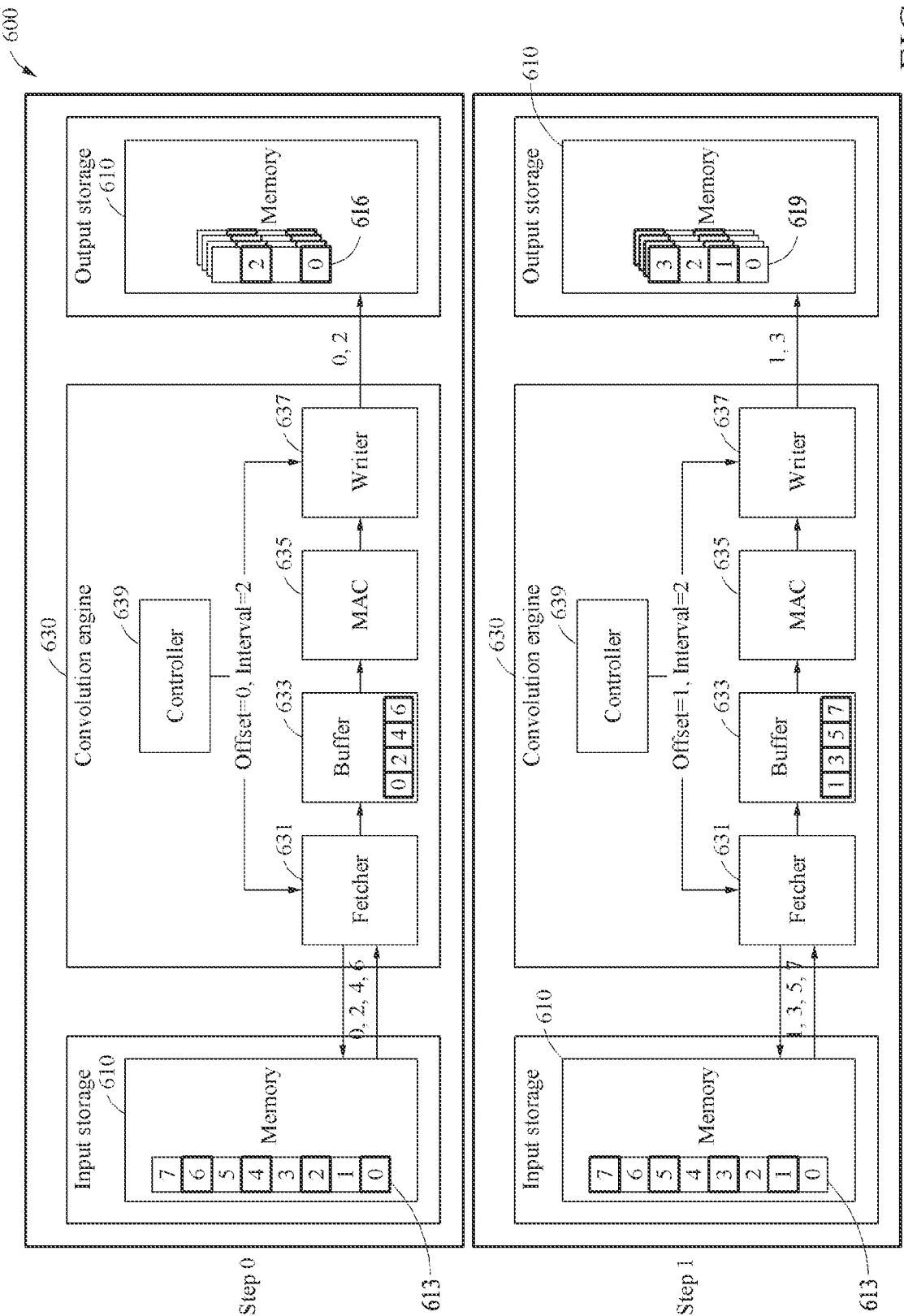
FIGS. 6 and 7 illustrate examples of an operating method of a neural network device.

FIG. 6 illustrates an example of a multi-step operating method of a neural network device. Referring to FIG. 6, a process in which a neural network device 600 performs a 1D convolution operation through step 0 and step 1 when a stride parameter is "1" is illustrated. In this example, a kernel may have a size of "3" and a dilation rate of "2", and the stride parameter may be "1".

In an example, when the stride parameter is a first value (e.g., "1"), a controller 639 may set a first offset and a second offset to a value (e.g., the dilation rate of "2"−1=1) corresponding to the dilation rate. In this example, an offset value may be set to be an index of a corresponding step. Also, the controller 639 may set a first interval and a second interval to have the same values as the dilation rate of "2". A number of multiple steps by the neural network device 600 may be identical to the dilation rate of "2", and accordingly steps 0 and 1 may be performed twice.

An operation of the neural network device 600 in step 0 will be described below. A fetcher 631 may fetch input data "0, 2, 4, 6" corresponding to positions reached by skipping a first interval (=2) from a first data "0" that is a position of an index corresponding to a first offset (=0) among eight data such as "0, 1, 2, 3, 4, 5, 6, 7" stored in a corresponding row of a first feature map 613 of a memory 610 according to the first offset (=0) and the first interval (=2).

The fetcher 631 may transfer the input data "0, 2, 4, 6" fetched from the memory 610 to a buffer 633. The buffer 633 may store the input data "0, 2, 4, 6".

A multiplier and accumulator (MAC) 635 may perform a convolution operation between the kernel and the input data "0, 2, 4, 6" stored in the buffer 633. For example, the MAC 635 may generate output data by performing a convolution operation between the input data "0, 2, 4, 6" and a kernel with a size of "3". As described above, according to examples, a technology for enabling data reuse even in a dilated convolutional neural network by fetching input data based on a dilated convolution operation.

A writer 637 may write output data in a third data "2" corresponding to a position reached by skipping a second interval (=2) from a first data "0" that is a position of an index corresponding to a second offset (=0) in a second feature map 616.

For example, the writer 637 may write a result of a convolution operation between input data "0, 2, 4" and the kernel in a first data of the second feature map 616, and may write a result of a convolution operation between input data "2, 4, 6" and the kernel in a third data of the second feature map 616. In a non-limiting example, the first data and the third data may respectively correspond to a first data and a third data of output feature map 305 respectively indicated by reference numerals 310 and 330 of FIG. 3. In this example, the input data "2, 4" may be reused.

Next, the controller 639 may increment a step index i and perform an operation of step 1.

In step 1, the fetcher 631 may fetch input data "1, 3, 5, 7" corresponding to positions reached by skipping a first interval (=2) from a second data "1" that is a position of an index corresponding to a first offset (=1) among the eight data such as "0, 1, 2, 3, 4, 5, 6, 7" stored in a corresponding row of the first feature map 613 of the memory 610 according to the first offset (=1) and the first interval (=2).

The fetcher 631 may transfer the input data "1, 3, 5, 7" fetched from the memory 610 to the buffer 633. The buffer 633 may store the input data "1, 3, 5, 7".

The MAC 635 may perform a convolution operation between the input data "1, 3, 5, 7" stored in the buffer 633 and the kernel. For example, the MAC 635 may generate output data by performing a convolution operation between the input data "1, 3, 5, 7" and a kernel with a size of "3".

The writer 637 may write output data in a fourth data "3" corresponding to a position reached by skipping a second interval (=2) from a second data "1" that is a position of an index corresponding to a second offset (=1) in the second feature map 616.

For example, the writer 637 may write a result of a convolution operation between input data "1, 3, 5" and the kernel in the second data of the second feature map 616, and may write a result of a convolution operation between input data "3, 5, 7" and the kernel in the fourth data of the second feature map 616. In a non-limiting example, the second data and the fourth data may respectively correspond to a second data and a fourth data of output feature map 305 respectively indicated by reference numerals 320 and 340 of FIG. 3. In this example, the input data "3, 5" may be reused.

When the operations of steps 0 and 1 are completed, all values of four data may be stored as shown in a second feature map 619.

Figure 7:
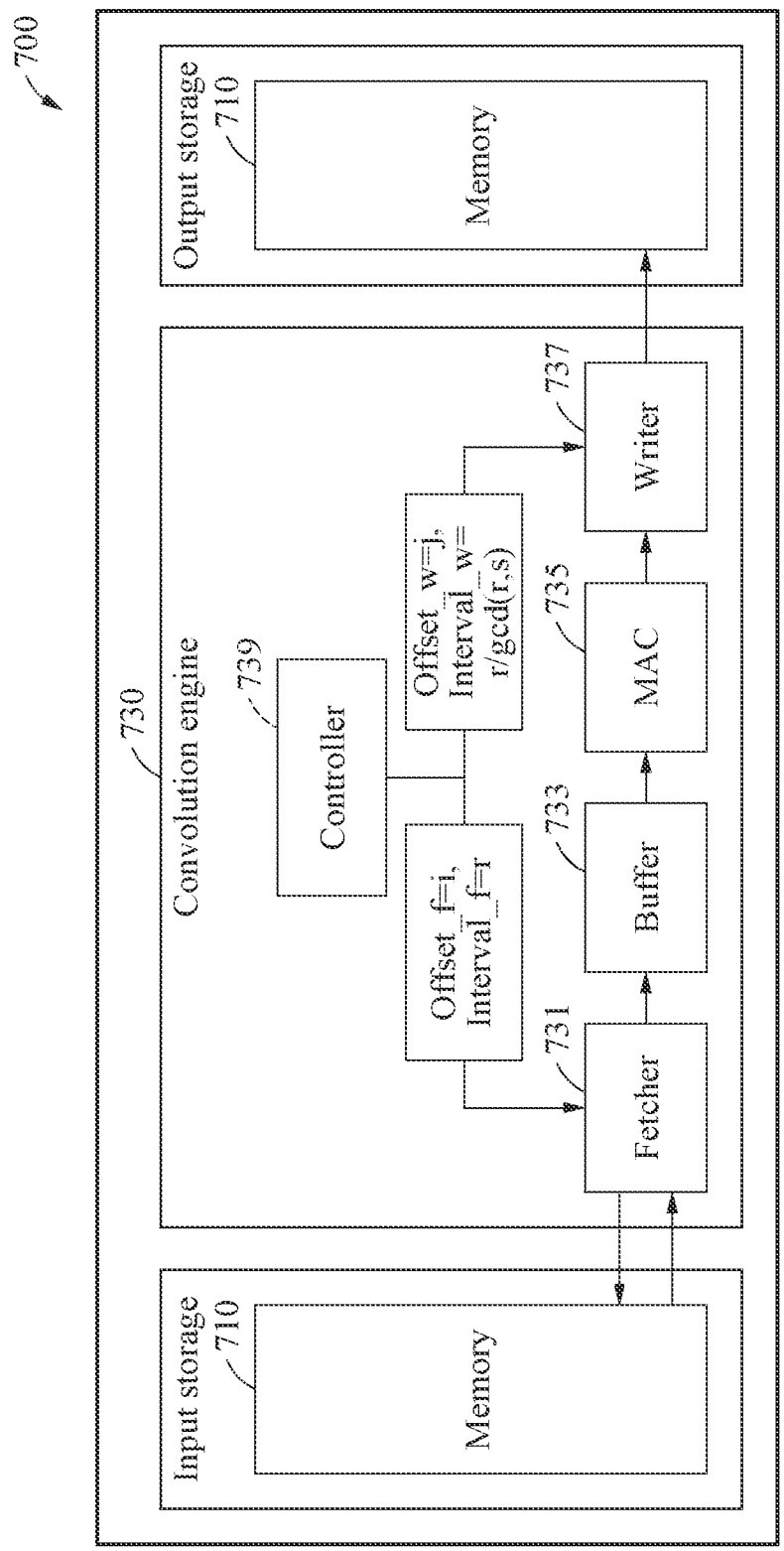

FIG. 7 illustrates an example of an operating method of a neural network device. Referring to FIG. 7, an operation of a neural network device 700 may be performed when a stride parameter is greater than "1".

When a stride parameter having a value greater than "1" is included, the neural network device 700 may perform a convolution operation by adjusting an offset and an interval of a fetcher 731 to be different from an offset and an interval of a writer 737.

When a stride parameter of a convolution operation is greater than a first value (e.g., "1"), a controller 739 may set a first offset Offset_f for the fetcher 731 and a second offset Offset_w for the writer 737 to be different from each other. For example, the controller 739 may set the first offset based on a combination (e.g., a product) of a multi-step index and a stride parameter, and may set the second offset as a multi-step index.

Also, the controller 739 may set a first interval Interval_f for the fetcher 731 and a second interval Interval_w for the writer 737 to be different from each other. The controller 739 may determine the first interval Interval_f to have the same value as a dilation rate r, and may determine the second interval Interval_w to have a value of "r/gcd(r,s)" obtained by dividing the dilation rate r by a GCD of the dilation rate r and a stride parameter s.

The controller 739 may control the fetcher 731 to fetch input data without redundancy from a first feature map of a memory 710 according to the first offset Offset_f and the first interval Interval_f so that the input data may be stored in a buffer 733. The controller 739 may control the buffer 733 to transmit the stored input data to a MAC 735.

The controller 739 may control the MAC 735 to generate output data by performing a convolution operation between a kernel and the input data received from the buffer 733 and to transfer the output data to the writer 737.

The controller 739 may control the writer 737 to write the output data without redundancy in a second feature map (not shown) of the memory 710 according to the second offset Offset_w and the second interval Interval_w. If a convolution operation is repeatedly performed by the neural network device 700, i may be increased by stride(s) and j may be increased by "1".

Figure 8:
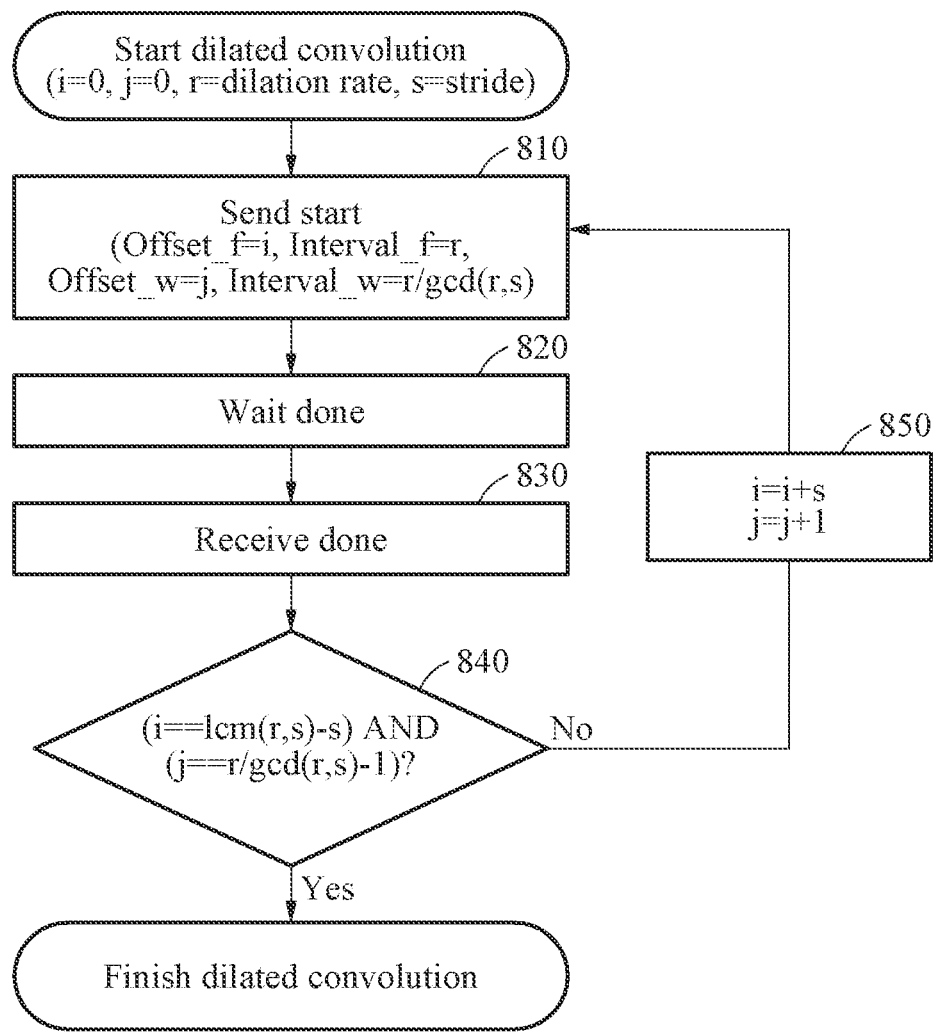
FIG. 8 illustrates an example of an operating process of a neural network device.

FIG. 8 illustrates an example of an operating process of a neural network device. Referring to FIG. 8, a process in which a controller of the neural network device performs a dilated convolution operation through a process of operations 810 to 850 when a stride parameter is greater than "1" is illustrated.

In operation 810, the controller may transmit a start signal to each module (e.g., a fetcher, a buffer, a processing element (or an operator), a writer, and the like). In this example, a value of a first offset Offset_f may be set to "i", and a value of a first interval Interval_f may be set to be the same as a dilation rate r of a kernel. In addition, a value of a second offset Offset_w may be set to "j", and a second interval Interval_w may be set to a value of "r/gcd(r,s)" obtained by dividing the dilation rate r by a GCD of the dilation rate r and a stride parameter s. Here, i may denote a product of a multi-step index and a stride parameter, and j may denote a multi-step index.

In operation 820, the controller may wait until a convolution operation-done signal according to the above-described interval and offset is received from each module.

When the convolution operation-done signal is received from each module in operation 830, the controller may determine whether i set as a value of the first offset satisfies a first condition of having the same value as a value of "lcm(r,s)−" obtained by subtracting the stride parameter s from an LCM of the dilation rate r and the stride parameter s, and whether j set as a value of the second offset satisfies a second condition of having the same value as a value of "r/(gcd(r,s))−1" obtained by subtracting "1" from a value obtained by dividing the dilation rate r by a GCD of the dilation rate r and the stride parameter s in operation 840.

In an example, when it is determined that the first offset and the second offset satisfy the first condition and the second condition, respectively, in operation 840, the controller may finish a convolution operation. In another example, when it is determined that the first offset and the second offset do not satisfy the first condition and the second condition, respectively, in operation 840, the controller may increase the value of i by "i+s" and increase the value of j by "1" in operation 850. Subsequently, the controller may perform the convolution operation by repeatedly performing the process from operations 810 to 840.

Figure 9:
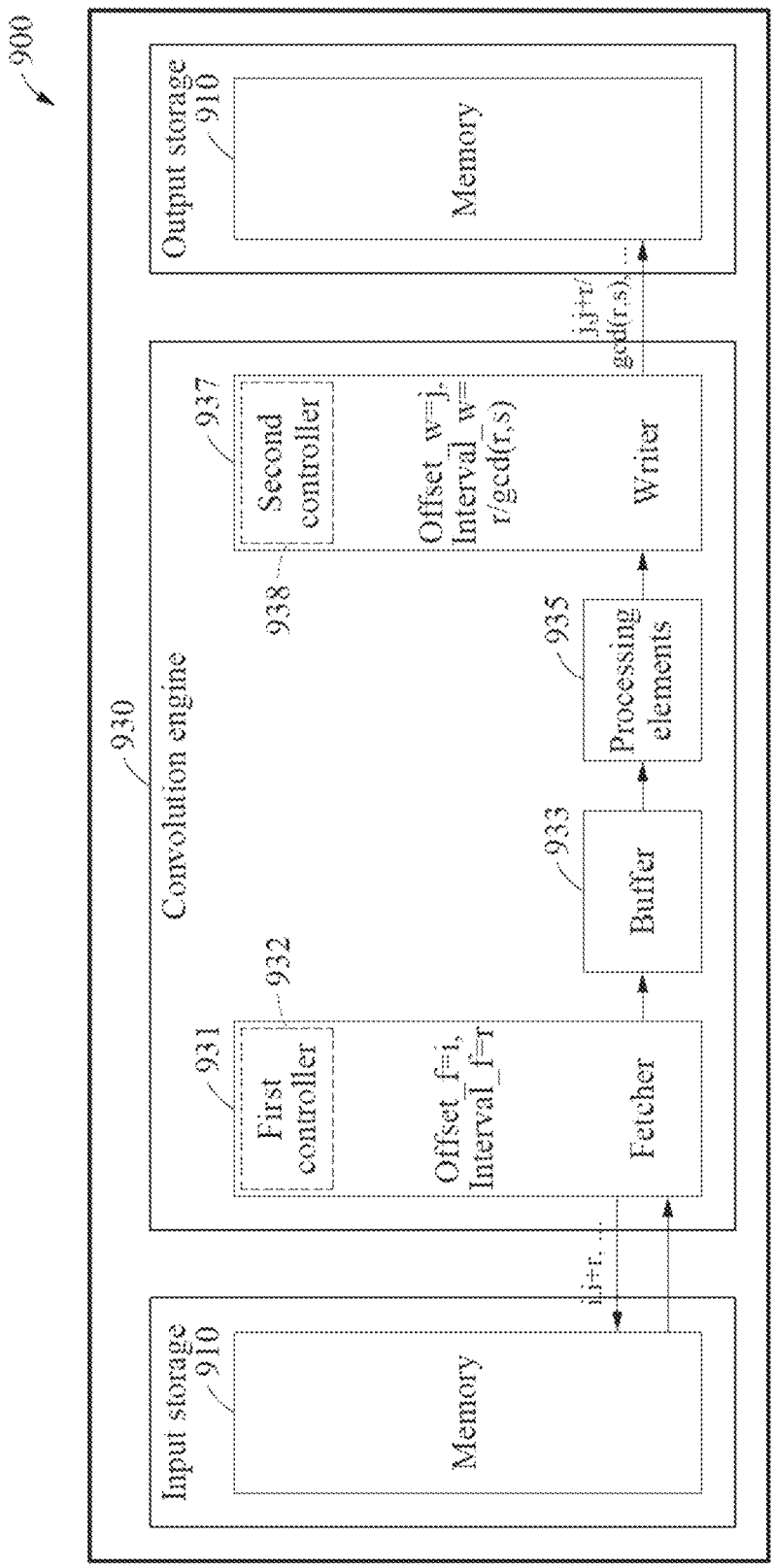
FIG. 9 illustrates an example of a configuration of a neural network device.

FIG. 9 illustrates an example of a configuration of a neural network device. Referring to FIG. 9, a configuration of a neural network device 900 in which a controller is included in each of a fetcher 931 and a writer 937 is illustrated.

In an example, a first controller 932 configured to control an operation of the fetcher 931, and a second controller 938 configured to control an operation of the writer 937 may be provided. The first controller 932 may control the fetcher 931 to fetch input data without redundancy from a first feature map (not shown) of a memory 910 according to a first offset Offset_f and a first interval Interval_f so that the input data may be stored in a buffer 933.

The second controller 938 may control the writer 937 to write output data of a processing element 935 without redundancy in a second feature map (not shown) of the memory 910, according to a second offset Offset_w and a second interval Interval_w.

In this example, tasks assigned to the buffer 933 and the processing element 935 may be for an overall dilated convolution operation, not for a single step.

Figure 10:
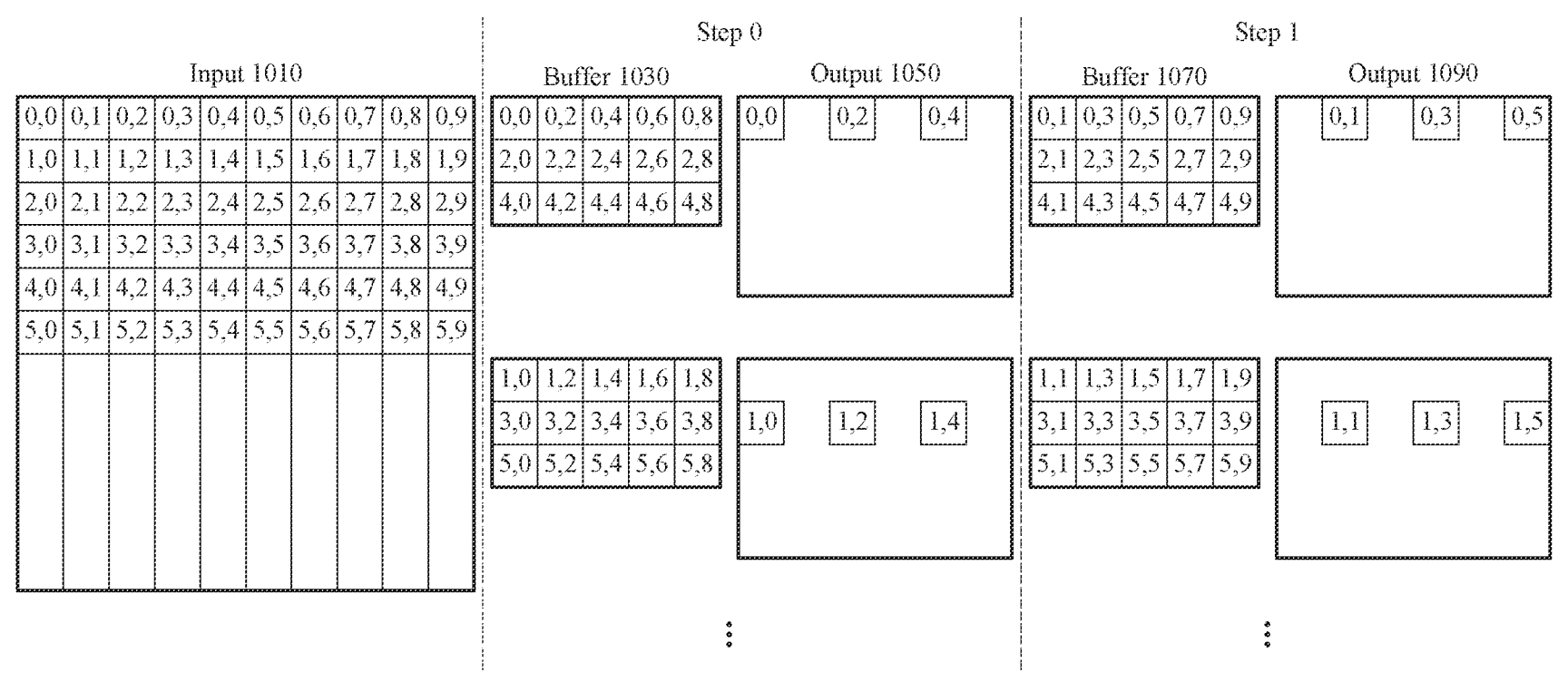

FIG. 10 illustrates an example of a method of performing a two-dimensional (2D) convolution operation in a neural network device. Referring to FIG. 10, a process of performing a 2D dilated convolution operation between input data 1010 and a kernel having a size of 3×3 and a dilation rate of "2" is illustrated.

In step 0, the neural network device may operate by setting a first offset and a second offset to "0" and setting a first interval and a second interval to "2" in a row direction in a first feature map 1010 and second feature maps 1050 and 1090 of a memory.

In this example, a fetcher may fetch input data at an interval of two spaces corresponding to the first interval in a column direction by "3" that is the size of the kernel, from a row where calculation is to be performed in the first feature map 1010. For example, the fetcher may fetch input data ['0,0', '2,0', '4,0'] corresponding to positions reached by skipping the first interval (=2) corresponding to the size (=3) of the kernel in the column direction from a position (0, 0) of an index corresponding to the first offset in a first row on which an operation is to be performed. In the same manner, the fetcher may fetch input data ['0,2', '2,2', '4,2'], ['0,4', '2,4', '4,4'], ['0,6', '2,6', '4,6'], and ['0,8', '2,8', '4,8']. Although an example in which input data is fetched preferentially in the column direction has been described above for convenience of description, a design may be changed so that input data is fetched preferentially in the row direction according to implementations.

The input data fetched by the fetcher from the first feature map 1010 may be stored in a buffer 1030, and a writer may write a result of a convolution operation between the kernel and the input data stored in the buffer 1030 as output data in the second feature map 1050. In this example, the writer may sequentially write output data (0,0), (0,2), (0,4) by skipping the second interval (=2) for a corresponding row of the second feature map 1050.

When operations of all rows are completed in step 0, the neural network device may perform a next step, that is, step 1. In step 1, the neural network device may set the first offset and the second offset to "1" and may repeatedly perform the above-described process.

For example, the fetcher may fetch input data ['0,1', '2,1', '4,1'], ['0,3', '2,3', '4,3'], ['0,5', '2,5', '4,5'], ['0,7', '2,7', '4,7'], and ['0,9', '2, 9', '4,9']. The input data fetched by the fetcher from the first feature map 1010 may be stored in a buffer 1070, and the writer may write a result of a convolution operation between the kernel and the input data stored in the buffer 1070 as output data in the second feature map 1090. In this example, the writer may sequentially write output data (0,1), (0,3), (0,5) by skipping the second interval (=2) for a corresponding row of the second feature map 1090. The neural network device may also perform a dilated convolution operation on each row in step 1.

Figure 11:
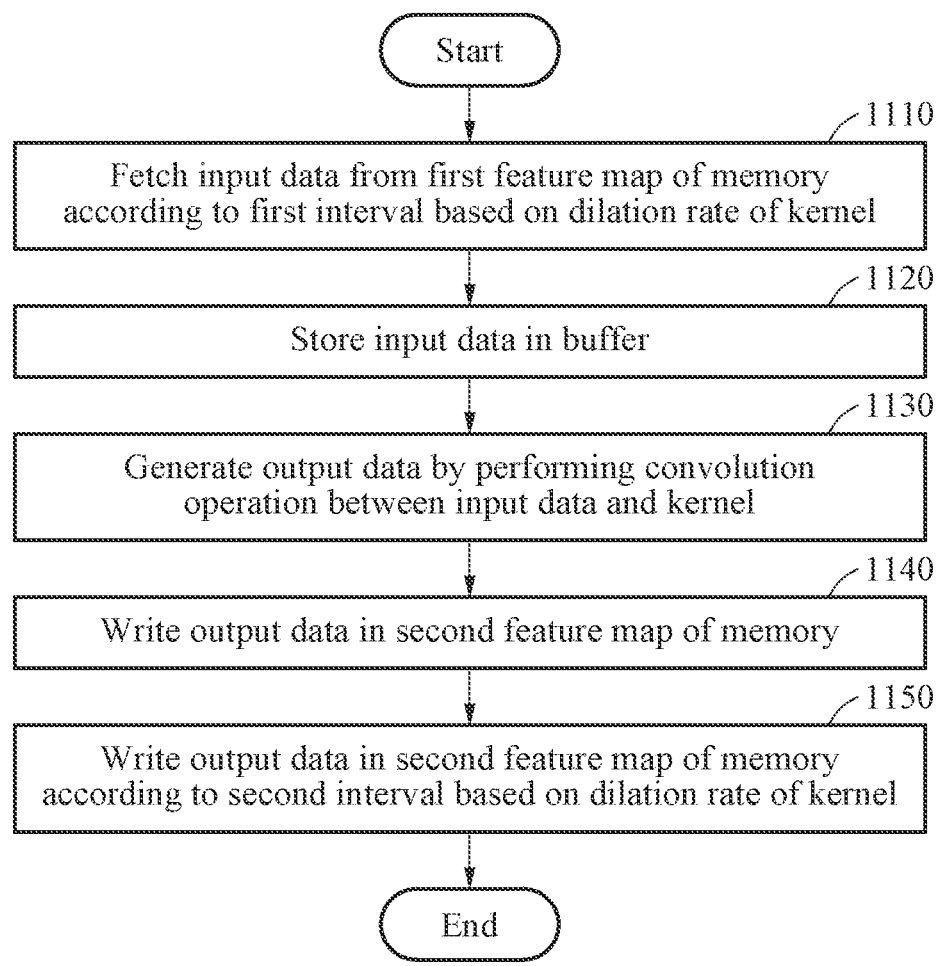
FIG. 11 illustrates an example of an operating method of a neural network device.

FIG. 11 illustrates an example of an operating method of a neural network device. Referring to FIG. 11, the neural network device may fetch data stored in a memory, may perform a convolution operation, and may write an operation result as output data in the memory, through a process of operations 1110 to 1150.

In operation 1110, the neural network device may fetch input data from a first feature map of the memory according to a first interval based on a dilation rate of a kernel. The neural network device may fetch input data without redundancy from the first feature map according to the first interval and a first offset based on the dilation rate. In operation 1120, the neural network device may store the input data in a buffer.

In operation 1130, the neural network device may generate output data by performing a convolution operation between the input data and the kernel. For example, when the first feature map includes a plurality of channels, the neural network device may perform a convolution operation between the channels and the kernel.

In operation 1140, the neural network device may write the output data in a second feature map of the memory. An interval between pieces of output data arranged adjacent to each other in the second feature map may be determined based on, for example, at least one of the dilation rate and a stride parameter of the convolution operation.

In operation 1150, the neural network device may write the output data in the second feature map of the memory according to a second interval based on the dilation rate of the kernel. The neural network device may write the output data without redundancy in the second feature map of the memory according to the second interval and a second offset based on the dilation rate. For example, the neural network device may write output data at positions reached by skipping the second interval from a position of an index corresponding to the second offset in the second feature map.

Figure 12:
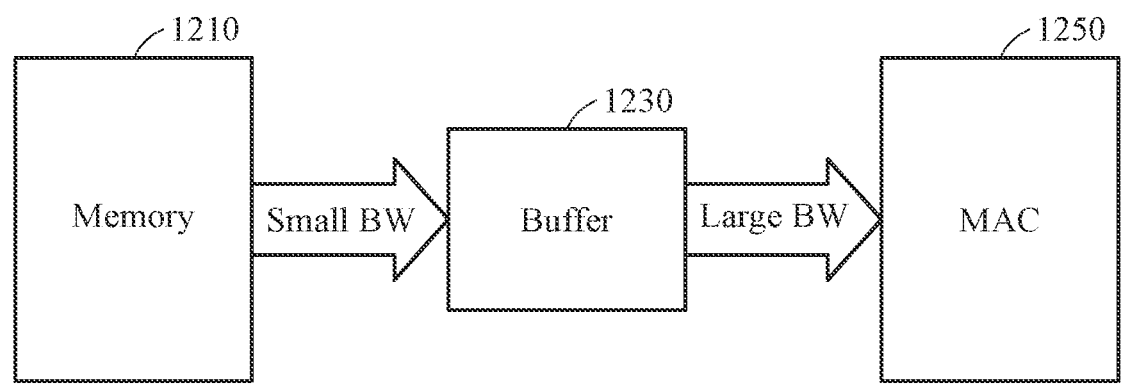
FIG. 12 illustrates an example of a configuration of a neural network device.

FIG. 12 illustrates an example of a configuration of a neural network device. Referring to FIG. 12, a structure of a neural network device including a memory 1210, a buffer 1230, and a MAC 1250 is illustrated. In this example, the buffer 1230 may correspond to a reuse buffer.

The neural network device may boost a bandwidth using a reuse buffer. When a dilated convolution operation is performed in a high-performance neural network processor, a problem of memory costs may occur. This is because the high-performance neural network processor is required to perform the dilated convolution operation and a bandwidth of a memory required according to an increase in computing power of a neural network processor also increases.

In an example, the buffer 1230 may be used as a reuse buffer, and thus the neural network device of one or more embodiments may perform a dilated convolution operation with a buffer small in size, and may increase the bandwidth even though an additional memory is not used.

The neural network device may be or include, for example, a HUD device, a 3D DID, a navigation system, a 3D mobile device, a smartphone, a smart TV, and/or a smart vehicle, but is not necessarily limited thereto. The 3D mobile device may be construed as including all display devices such as, for example, a display device for displaying augmented reality (AR), virtual reality (VR), and/or mixed reality (MR), a head-mounted display (HMD), a face-mounted display (FMD), and/or the like.

The neural network devices, memories, neural network processors, fetchers, buffers, processing elements, writers, controllers, MACs, first controllers, second controllers, neural network device 400, memory 410, neural network processor 430, fetcher 431, buffer 433, processing element 435, writer 437, controller 439, neural network device 600, memory 610, neural network processor 630, fetcher 631, buffer 633, MAC 635, writer 637, controller 639, neural network device 700, memory 710, neural network processor 730, fetcher 731, buffer 733, MAC 735, writer 737, controller 639, neural network device 900, memory 910, neural network processor 930, fetcher 931, first controller 932, buffer 933, processing element 935, writer 937, second controller 938, memory 1210, buffer 1230, MAC 1250, and other apparatuses, devices, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A neural network device comprising:
a memory configured to store a first feature map and a second feature map; and
a neural network processor configured to operate a neural network, wherein:
the neural network processor is configured to fetch input data from the first feature map of the memory using a fetcher;
the neural network processor comprises a buffer configured to store the input data;
the neural network processor comprises an operator configured to generate output data by performing a convolution operation between the input data and a kernel;
the neural network processor is configured to write the output data in the second feature map of the memory using a writer; and
the neural network processor comprises a controller configured to control the fetcher to fetch the input data and control the writer to write the output data, according to one or more intervals determined based on a dilation rate of the kernel and one or more offsets each determined based an index of a corresponding step among multiple steps.

2. The device of claim 1, wherein, for the controlling of the fetcher, the controller is configured to control the fetcher to fetch the input data without redundancy from the first feature map of the memory according to a first offset of the one or more offsets and a first interval of the one or more intervals determined based on the dilation rate.

3. The device of claim 2, wherein, for the fetching of the input data, the neural network processor is configured to fetch pieces of the input data corresponding to positions reached by skipping the first interval in a predetermined direction from a position of an index corresponding to the first offset in the first feature map using the fetcher.

4. The device of claim 1, wherein,
the one or more offsets comprise a plurality of offsets,
the one or more intervals comprise a plurality of intervals, and
for the controlling of the writer, the controller is configured to control the writer to write the output data without redundancy in the second feature map of the memory according to a second offset of the plurality of offsets and a second interval of the plurality of intervals determined based on the dilation rate.

5. The device of claim 4, wherein, for the writing of the output data, the neural network processor is configured to write the output data at positions reached by skipping the second interval in a predetermined direction from a position of an index corresponding to the second offset in the second feature map using the writer.

6. The device of claim 1, wherein
the one or more offsets comprise a plurality of offsets,
the one or more intervals comprise a plurality of intervals,
for the fetching of the input data, the neural network processor is configured to fetch the input data from the first feature map of the memory according to a first offset of the plurality of offsets and a first interval of the plurality of intervals using the fetcher, and
for the writing of the output data, the neural network processor is configured to write the output data in the second feature map of the memory according to a second offset of the plurality of offsets and a second interval of the plurality of intervals using the writer.

7. The device of claim 6, wherein, in response to a stride parameter of the convolution operation being a preset first value, the controller is configured to:
set the first interval and the second interval to have same values as a value corresponding to the dilation rate; and
set the first offset and the second offset to have same values as a value of the index of the corresponding step among the multiple steps.

8. The device of claim 6, wherein, in response to a stride parameter of the convolution operation being greater than or equal to a preset first value, the controller is configured to:
set the first interval and the second interval to be different from each other; and
set the first offset and the second offset to be different from each other.

9. The device of claim 8, wherein, for the setting of the first offset and the second offset, the controller is configured to:
set the first offset based on a combination of the stride parameter and a value of the index of the corresponding step among the multiple steps; and
set the second offset to the value of the index of the corresponding step.

10. The device of claim 8, wherein, for the setting of the first interval and the second interval, the controller is configured to:
set the first interval to have a same value as a value of the dilation rate; and
set the second interval to a value obtained by dividing the dilation rate by a greatest common divisor (GCD) of the dilation rate and the stride parameter.

11. The device of claim 8, wherein the controller is configured to determine a total number of the multiple based on whether the first offset satisfies a first condition of having a same value as a value obtained by subtracting the stride parameter from a least common multiple (LCM) of the dilation rate and the stride parameter, and based on whether the second offset satisfies a second condition of having a same value as a value obtained by subtracting "1" from a value obtained by dividing the dilation rate by a GCD of the dilation rate and the stride parameter.

12. The device of claim 1, wherein, for the generating of the output data, in response to the first feature map comprising a plurality of channels, the operator is configured to perform a dilated convolution operation between the channels and the kernel.

13. The device of claim 1, wherein an interval between pieces of output data arranged adjacent to each other in the second feature map is determined based on either one or both of the dilation rate and a stride parameter of the convolution operation.

14. The device of claim 1, wherein the neural network device comprises any one or any combination of any two or more of a head-up display (HUD) device, a three-dimensional (3D) digital information display (DID), a navigation system, a 3D mobile device, a smartphone, a smart television (TV), and a smart vehicle.

15. The device of claim 1, wherein the memory is configured to store instructions that, when executed by the neural network processor, configure the neural network processor to operate the neural network.

16. An operating method of a neural network device, the method comprising:
fetching input data from a first feature map of a memory according to a first interval determined based on a dilation rate of a kernel and a first offset determined based on an index of a corresponding step;
storing the input data in a buffer;
generating output data by performing a convolution operation between the input data and the kernel; and
writing the output data in a second feature map of the memory according to a second interval determined based on the dilation rate of the kernel.

17. The method of claim 16, wherein the fetching of the input data comprises fetching the input data without redundancy from the first feature map according to the first interval and a first offset determined based on the dilation rate.

18. The method of claim 17, wherein the fetching of the input data comprises fetching pieces of the input data corresponding to positions reached by skipping the first interval in a predetermined direction from a position of an index corresponding to the first offset in the first feature map.

19. The method of claim 16, wherein the writing of the output data comprises writing the output data without redundancy in the second feature map of the memory according to the second interval and a second offset determined based on the dilation rate.

20. The method of claim 19, wherein the writing of the output data comprises writing the output data at positions reached by skipping the second interval in a predetermined direction from a position of an index corresponding to the second offset in the second feature map.

21. The method of claim 16, wherein
the fetching of the input data comprises fetching the input data from the first feature map according to the first interval and a first offset determined based on the dilation rate, and
the writing of the output data comprises writing the output data in the second feature map of the memory according to the second interval and a second offset determined based on the dilation rate.

22. The method of claim 21,
wherein the method is repeatedly performed in multiple steps, and further comprising, in response to a stride parameter of the convolution operation being a preset first value, setting the first interval and the second interval to have same values as a value corresponding to the dilation rate, and setting the first offset and the second offset to have same values as a value of the index of the corresponding step among the multiple steps.

23. The method of claim 21, further comprising, in response to a stride parameter of the convolution operation being greater than or equal to a preset first value, setting the first interval and the second interval to be different from each other, and setting the first offset and the second offset to be different from each other.

24. The method of claim 23, further comprising:
setting the first offset t based on a combination of the stride parameter and a value of the index of the corresponding step among multiple steps; and
setting the second offset to the value of the index of the corresponding step.

25. The method of claim 23, further comprising:
setting the first interval to have a same value as a value of the dilation rate; and
setting the second interval to a value obtained by dividing the dilation rate by a greatest common divisor (GCD) of the dilation rate and the stride parameter.

26. The method of claim 23, wherein
the method is repeatedly performed in multiple steps, and
a number of the multiple steps is determined based on whether the first offset satisfies a first condition of having a same value as a value obtained by subtracting the stride parameter from a least common multiple (LCM) of the dilation rate and the stride parameter, and based on whether the second offset satisfies a second condition of having a same value as a value obtained by subtracting "1" from a value obtained by dividing the dilation rate by a GCD of the dilation rate and the stride parameter.

27. The method of claim 16, wherein the generating of the output data comprises, in response to the first feature map comprising a plurality of channels, performing a dilated convolution operation between the channels and the kernel.

28. The method of claim 16, wherein an interval between pieces of output data arranged adjacent to each other in the second feature map is determined based on either one or both of the dilation rate and a stride parameter of the convolution operation.

29. A non-transitory computer-readable storage medium storing instructions that, when executed by a processor, configure the processor to perform the method of claim 16.

30. A neural network device comprising:
one or more processors comprising processing circuitry; and
memory comprising one or more storage media storing instructions that, when executed individually or collectively by the one or more processors, cause the neural network device to:
determine, based on a dilation rate of a kernel and an offset determined based on an index of a corresponding step, input data to be fetched among pieces of a first feature map stored in a memory;
fetch the determined input data from the memory and store the input data in a buffer;
generate output data by performing a convolution operation between the input data and the kernel; and
write the output data to a second feature map in the memory.

31. The device of claim 30, wherein, for the determining of the input data to be fetched, the execution of the instructions causes the neural network device to determine the input data to be pieces of the first feature map separated by the dilation rate.

32. The device of claim 30, wherein, for the performing of the convolution operation, the execution of the instructions causes the neural network device to perform a first convolution operation between a first portion of the input data and the kernel, and a second convolution operation between a second portion of the input data and the kernel.

33. The device of claim 32, wherein the second portion includes:
one or more pieces of the first feature map included in the first portion; and
one or more pieces of the first feature map not included in the first portion.

34. The device of claim 30, wherein, in response to the writing of the output data, the execution of the instructions causes the neural network device to determine, based on the dilation rate and a stride parameter, subsequent input data to be fetched among the pieces of the first feature map stored in the memory.

35. The device of claim 34, wherein the subsequent input data includes different pieces of the first feature map than included in the input data.

36. An operating method of a neural network device, the method comprising:
determining, based on an offset determined based on an index of a corresponding step, pieces of a first feature map separated by a dilation rate of a kernel;
generating a second feature map by performing a convolution operation between the pieces and the kernel, wherein the kernel is not dilated by the dilation rate and the second feature map corresponds to a feature map generated by performing a convolution operation between the first feature map and the kernel dilated by the dilation rate.

37. The method of claim 36, wherein the convolution operation between the pieces and the kernel comprises a first convolution operation and a second convolution operation, and a portion of the pieces used in the first convolution operation is reused in the second convolution operation.

\* \* \* \* \*